United States Patent [19]

Szmuszkovicz

[11] 3,856,802
[45] Dec. 24, 1974

[54] 1,6-DISUBSTITUTED-4H-5-[4,3-A]BENZODIAZEPINES
[75] Inventor: Jacob Szmuszkovicz, Kalamazoo, Mich.
[73] Assignee: The Upjohn Company, Kalamazoo, Mich.
[22] Filed: July 19, 1973
[21] Appl. No.: 380,666

Related U.S. Application Data
[63] Continuation-in-part of Ser. No. 142,068, May 10, 1971, abandoned.

[52] U.S. Cl.................. 260/296 T, 71/90, 71/92, 260/239.3 D, 260/294.8 B, 260/295 H, 260/308 R, 260/329 F, 424/263, 424/269
[51] Int. Cl.. C07d 57/02, C07d 99/04, C07d 99/06
[58] Field of Search....... 260/294.8 B, 296 T, 308 R

[56] References Cited
UNITED STATES PATENTS
| 3,299,053 | 1/1967 | Archer et al. | 260/239 BD |
| 3,407,211 | 10/1968 | Berger et al. | 260/239 BD |
| 3,741,957 | 6/1973 | Hester | 260/308 R |

FOREIGN PATENTS OR APPLICATIONS
| 2,012,090 | 9/1970 | Germany | 260/308 R |
| 6,916,543 | 5/1970 | Netherlands | 260/308 R |

*Primary Examiner*—Alton D. Rollins

[57] ABSTRACT
1,6-Disubstituted-4H-s-triazolo[4,3-a][1,4]benzodiazepines of the formula II:

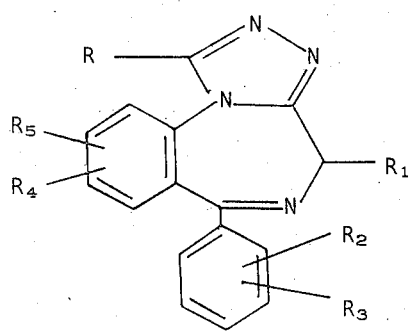

wherein R is an aromatic heterocyclic ring compound moiety selected from 2-, 3-, and 4-pyridyl, 2-thienyl, and 2-furyl; wherein $R_1$ is selected from the group consisting of hydrogen and alkyl of one to three carbon atoms, inclusive; wherein $R_2$, $R_3$, $R_4$, and $R_5$ are selected from the group consisting of hydrogen, halogen, nitro, trifluoromethyl, and alkylthio in which alkyl is defined as above, are produced by condensing a 5-phenyl-1,3-dihydro-2H-1,4-benzodiazepin-2-thione of the formula (I):

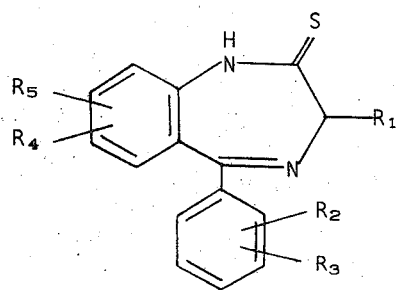

wherein $R_1$, $R_2$, $R_3$, $R_4$, and $R_5$ are defined as above, with a hydrazine of the formula III:

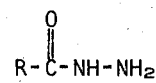

in which R is defined as above.

The new products of formula II including their pharmacologically acceptable acid addition salts and the N-oxides (in position 5) of II and the said salts are useful as sedatives, hypnotics, anticonvulsants, tranquilizers, and muscle relaxants in mammals and birds.

10 Claims, No Drawings

1,6-DISUBSTITUTED-4H-5-[4,3-A] BENZODIAZEPINES

CROSS REFERENCE TO RELATED APPLICATION

This application is a continuation-in-part of application Ser. No. 142,068, filed May 10, 1971, and now abandoned.

BACKGROUND OF THE INVENTION

FIELD OF THE INVENTION

This invention is directed to new organic compounds and is particularly concerned with novel 1,6-disubstituted-4H-s-triazolo[4,3-a][a,4]benzodiazepines and a process for the production thereof.

The novel compounds and the process of production therefor can be illustratively represented as follows:

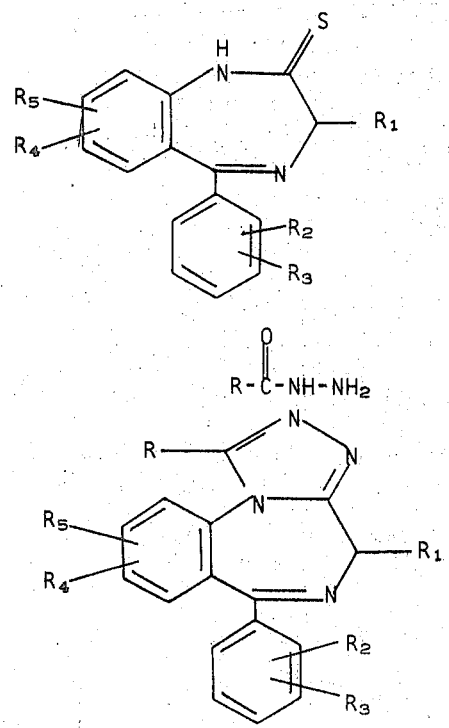

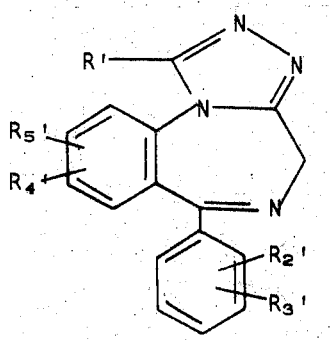

wherein R is an aromatic heterocyclic ring radical selected from the group consisting of 2-, 3-, and 4-pyridyl, 2-thienyl and 2-furyl; wherein $R_2$, $R_3$, $R_4$ and $R_5$ are selected from the group consisting of hydrogen, halogen, nitro, trifluoromethyl, and alkylthio in which alkyl is defined as above; and wherein $R_1$ is selected from the group consisting of hydrogen and alkyl of one to three carbon atoms, inclusive.

The more important compounds have the formula IIA wherein R' is selected from the group consisting of 2-, 3-, and 4-pyridyl; and wherein $R_2'$, $R_3'$, $R_4'$, and $R_5'$ are selected from the group consisting of hydrogen, halogen, and nitro, and the pharmacologically acceptable acid addition salts thereof and the 4-N-oxides thereof.

The most valuable compounds have the formula IIB

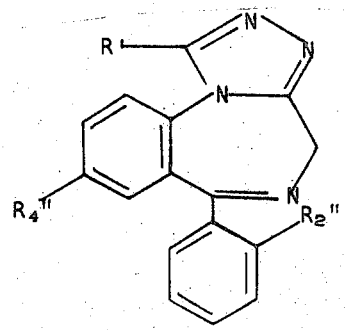

wherein R' is selected from the group consisting of 2-, 3-, and 4-pyridyl; and wherein $R_2''$ and $R_4''$ are selected from hydrogen and chlorine, and the pharmacologically acceptable acid addition salts thereof.

The process of this invention comprises: condensing a 5-substituted-1,3-dihydro-2H-1,4-benzodiazepine-2-thione of formula I, in an organic solvent, e.g., a lower-alkanol of one to four carbon atoms, inclusive, or cyclohexanol, with an acid hydrazide III, at a temperature between 60° and 120° C. and, if necessary, heating thereafter to 150°–250° C. to give a diazepine of formula II, i.e. the corresponding 1,6-disubstituted-4-H-s-triazolo[4,3-a][1,4]benzodiazepine (II). Compounds of formula II can be separated by conventional methods such as extraction, chromatography, crystallization and the like. The N-oxides are made in conventional manner e.g. by treatment of II in a lower alkanol solution e.g. in an ice-bath with a peracid e.g. m-chloroperbenzoic acid.

DESCRIPTION OF THE PREFERRED EMBODIMENT

Lower alkyl groups of 1 to 3 carbon atoms, inclusive, are exemplified by methyl, ethyl, propyl, and isopropyl.

Halogen means fluorine, chlorine, and bromine.

The novel compounds of the formula 11, N-oxides, and pharmacologically acceptable addition salts thereof have sedative, hypnotic, anticonvulsant, tranquilizing, and muscle relaxant effect in mammals and birds. Also as feed additives they increase growth rate and feed efficiency of livestock and poultry.

The pharmacologically acceptable acid addition salts of compounds of formula II (as well as the more desirable subgeneric compounds IIA and IIB) contemplated in this invention, are the hydrochlorides, hydrobromides, hydriodides, sulfates, phosphates, cyclohexanesulfamates, methanesulfonates, and the like, prepared by reacting a compound of formula II with the selected pharmacologically acceptable acid.

Sedative effects of 8-chloro-1-(4-pyridyl)-6-phenyl-4H-s-triazolo[4,3-a][1,4]benzodiazepin are shown by the following tests in mice:

Chimney test:

[Med. Exp. 4, 11 (1961)]: The effective intraperitoneal dosage for 50% of mice ($ED_{50}$) is 5 mg./kg. The test determines the ability of mice to back up and out of a vertical glass cylinder within 30 seconds. At the effective dosage, 50% of the mice failed doing it.

Dish test:

Mice in petri dishes (10 cm. diameter, 5 cm. high, partially embedded in wood shavings), climb out in a very short time, when not treated. Mice remaining in the dish for more than 30 minutes indicates tranquilization. $ED_{50}$ equals the dose of test compound at which 50% of the mice remain in the dish. The $ED_{50}$ (intraperitoneal administration) in this test was 4.5 mg/kg.;

Pedestal test:

The untreated mouse leaves the pedestal in less than a minute to climb back to the floor of the standard mouse box. Tranquilized mice will stay on the pedestal for more than 1 minute. The $ED_{50}$ (intraperitoneal administration) is 3.6 mg./kg.

Nicotine antagonism test:

Mice in a group of 6 are injected with the test compound (8-chloro-1-(4-pyridyl)-6-phenyl-4H-s-triazolo[4,3-a][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 0.45 mg./kg. of the test compound protected 50% of the mice against (2) and 0.5 mg./kg. against (3) ($ED_{50}$).

Antagonism to strychnine (as sulfate):

The effective dosage $ED_{50}$ of 8-chloro-1-(4-pyridyl)-6-phenyl-4H-s-triazolo[4,3-a][1,4]benzodiazepine is 7 mg./kg. orally in mice. The test consists in orally administering into groups of 6 mice the test compound, 8-chloro-1-(4-pyridyl)-6-phenyl-4H-s-triazolo[4,3-a]-[1,4]benzodiazepine, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds have (by intraperitoneal injection) $ED_{50}$ as shown in the table below.

The pharmaceutical forms contemplated by this invention include pharmaceutical compositions suited for oral, parenteral, and rectal use, e.g., tablets, powder packets, cachets, dragees, capsules, solutions, suspension, sterile injectable forms, suppositories, bougies, and the like. Suitable diluents or carrier such as carbohydrates (lactose), proteins, lipids, calcium phosphate, cornstarch, stearic acid, methylcellulose and the like may be used as carriers or for coating purposes. Water or oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

As tranquilizer the compounds of formula II, its pharmacologically acid addition salts and N-oxides thereof can be used in dosages of 0.05–10.0 mg./kg., with 0.1 to 2 mg./kg. preferred, in oral or injectable preparations as described above, to alleviate tension and anxiety in mammals, or birds, such as e.g., occurs when animals are in travel. In larger animals 5 kg. or over the lower dosage ranges are effective.

Other acid addition salts of the compounds of formula II can be made such as the fluosilicic acid addition salts which are useful mothproofing compounds or the trichloroacetates useful as herbicides against Johnson grass, Bermuda grass, yellow foxtail and green foxtail, and quack grass.

The starting materials of formula I of this invention, substituted or unsubstituted 1,3-dihydro-5-phenyl-2H-1,4-benzodiazepine-2-thiones, are described by G. A. Archer and L. H. Sternbach [J. Org. Chem. 20, 231 (1964) and U.S. Pat. No. 3,422,091]. These compounds (I) are made by the reaction of the known substituted or unsubstituted 1,3-dihydro-5-phenyl-2H-1,4-benzodiazepin-2-ones by heating with phosphorus pentasulfide in pyridine for about 45 minutes (Archer et al., ibid.). The following compounds of formula I are representative starting materials:

1,3-dihydro-5-phenyl-2H-1,4-benzodiazepine-2-thione;
6-chloro-1,3-dihydro-5-(m-bromophenyl)-2H-1,4-benzodiazepine-2-thione;
7-chloro-1,3-dihydro-5-phenyl-2H-1,4-benzodiazepine-2-thione;
7-chloro-1,3-dihydro-5-(o-chlorophenyl)-2H-1,4-benzodiazepine-2-thione;
8-chloro-1,3-dihydro-5-phenyl-2H-1,4-benzodiazepine-2-thione;

| COMPOUND | $ED_{50}$ (in mg./kg.) | | | |
|---|---|---|---|---|
| | Ch | D | P | Ni |
| 8-chloro-1-(3-pyridyl)methyl-6-phenyl]-4H-s-triazolo[4,3-a]-[1,4]benzodiazepine | 5.0 | 7 | 7 | 2.5 |
| 8-chloro-1-(2-furyl)-6-phenyl-4H-s-triazolo[4,3-a][1,4]benzodiazepine | 2 | 1.3 | 2.8 | 1.3 |
| 8-chloro-1-(4-pyridyl)-6-(o-chlorophenyl)-4H-s-triazolo-[4,3-a][1,4]benzodiazepine | 0.23 | 0.32 | 0.32 | 0.06 |

Ch = Chimney test
D = dish test
P = pedestal test
Ni = nicotine antagonism (3) test 7-bromo-1,3-dihydro-5-phenyl-2H-1,4-benzodiazepine-2-thione;

7-chloro-1,3-dihydro-5-(p-chlorophenyl)-2H-1,4-benzodiazepine-2-thione;

7-chloro-1,3-dihydro-5-(o-fluorophenyl)-2H-1,4-benzodiazepine-2-thione;

7-chloro-1,3-dihydro-5-(o-bromophenyl)-2H-1,4-benzodiazepine-2-thione;

3-ethyl-1,3-dihydro-5-(p-fluorophenyl)-2H-1,4-benzodiazepine-2-thione;

7-nitro-3-propyl-1,3-dihydro-5-(o-chlorophenyl)-2H-1,4-benzodiazepine-2-thione;

8-nitro-1,3-dihydro-5-(o-chorophenyl)-2H-1,4-benzodiazepine-2-thione;

7-bromo-1,3-dihydro-5-(o-bromophenyl)-2H-1,4-benzodiazepine-2-thione;

7-methyl-1,3-dihydro-5-(o-chlorophenyl)-2H-1,4-benzodiazepine-2-thione;

7-methylthio-1,3-dihydro-5-phenyl-2H-1,4-benzodiazepine-2-thione;

3-methyl-1,3-dihydro-5-(o-chlorophenyl-2H-1,4-benzodiazepine-2-thione;

7-trifluoromethyl-1,3-dihydro-5-(o-chlorophenyl)-2H-1,4-benzodiazepine-2-thione;

7-fluoro-1,3-dihydro-5-(o-chlorophenyl)-2H-1,4-benzodiazepine-2-thione;

6,9-dichloro-1,3-dihydro-5-(p-isopropylphenyl)-2H-1,4-benzodiazepine-2-thione;

6-nitro-1,3-dihydro-5-(o-chlorophenyl)-2H-1,4-benzodiazepine-2-thione; and the like.

The hydrazides III:

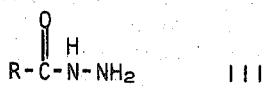

wherein R is 2, 3, or 4-pyridyl, 2-thienyl or 2-furyl are partially commercially available such as 2-furoic acid hydrazide, 2-thienoic acid hydrazide, nicotinic and isonicotinic acid hydrazide, or can easily be obtained by refluxing an ester of the formula R-COOalkyl (alkyl of one to three carbon atoms) with hydrazine hydrate e.g. in methanol.

In carrying out the process of the invention, a selected 1,3-dihydro-5-phenyl-2H-1,4-benzodiazepine-2-thione (I) in an inert organic solvent, preferably in a lower-alkanol, e.g., methanol, ethanol, 1-propanol, 2-propanol, 1-butanol, 2-butanol, or the like, with 1-butanol preferred, is heated to between 60°–120° C., preferably to the reflux temperature of the mixture, with the selected acid hydrazide R—CO—NH—NH$_2$ (III) defined as above. In the preferred embodiment of this invention the acid hydrazide is used in excess, such as from two to five times the theoretically required amount, but the reaction is operative with smaller or larger amounts. The reaction period is between 1 and 48 hours. At the termination of the reaction the reaction mixture can be evaporated to give a crude material, which may be the final product II or intermediate or a mixture of both. If it is the intermediate the crude product is heated above the melting point of compound II or heated to 150°–250° C. to give the compound of formula II. The desired product II is isolated and purified by conventional procedures e.g. neutralization of the reaction mixture, extraction, chromatography, crystallization, and the like.

The following examples are illustrative of the processes and products of the present invention, but are not to be construed as limiting.

EXAMPLE 1

8-Chloro-6-phenyl-1-(4-pyridyl)-4H-s-triazolo-[4,3-a][1,4]benzodiazepine

A mixture of 7-chloro-5-phenyl-1,3-dihydro-1,4-benzodiazepine-2-thione (5.74 g., 0.02 mole), isonicotinic acid hydrazide (8.23 g., 0.06 mole) and n-butyl alcohol (200 ml.) is refluxed for 2 hours. The solution is evaporated and the residue was dissolved in 50 ml. of ether and 50 ml. of methylene chloride. The aqueous layer is extracted once with methylene chloride, and the combined organic layer was washed with ether (3 × 50 ml.) saturated aqueous sodium chloride solution, and dried over anhydrous magnesium sulfate and evaporated. The residue is dissolved in 25 ml. of ethyl acetate and the solution filtered to clarify. Ether (25 ml.) was added to the solution. The solution is again filtered to clarify and allowed to crystallize; 4.1 g. of 8-chloro-6-phenyl-1-(4-pyridyl)-4H-s-triazolo[4,3-a][1,4]benzodiazepine of melting point 205°–206.5° C. is obtained. The second crop is 0.89 g. of melting point 203–204° (yield: 68%). The analytical sample is prepared by crystallization from ethyl acetate. It has a melting point of 205.5–206.5°.

Anal. calcd. for $C_{21}H_{14}ClN_5$:
C, 67.83; H, 3.79; Cl, 9.53; N, 18.84.
Found: C, 67.82; H, 3.68; Cl, 9.59; N, 18.81.

EXAMPLE 2

8-Chloro-6-phenyl-1-(3-pyridyl)-4H-s-triazolo-[4,3-a][1,4]benzodiazepine

A mixture of 7-chloro-1,3dihydro-5-phenyl-2H-1,4-benzodiazepine-2-thione (5.74 g., 0.02 mole), nicotinic acid hydrazide (8.23 g., 0.06 mole) and 200 ml. of n-butyl alcohol is refluxed for 4 hours. The solution is evaporated and the mixture was dissolved in 50 ml. of each water and methylene chloride. The organic layer is separated, washed with water (4 × 25 ml.), saturated salt solution, dried over anhydrous magnesium sulfate, and evaporated. The residue is crystallized from ethyl acetate-ether to give 5.25 g. (71% yield) of 8-chloro-6-phenyl-1-(3-pyridyl)-4H-s-triazolo[4,3-a][1,4]benzodiazepine of melting point 203°–204°, unchanged upon recrystallization from ethyl acetate.

Anal. calcd. for $C_{21}H_{14}ClN_5$:
C, 67.83; H, 3.79; Cl, 9.53; N, 18.84.
Found: C, 67.95; H, 3.82; Cl, 9.25; N, 18.79.

EXAMPLE 3

8-chloro-6-phenyl-1-(2-pyridyl)-4H-s-triazolo-[4,3-a][1,4]benzodiazepine

A mixture of 7-chloro-1,3-dihydro-5-phenyl-2H-1,4-benzodiazepine-2-thione (5.74 g., 0.02 mole), pyridine-2-carboxylic acid hydrazide [prepared from ethyl picolinate, and hydrazine hydrate according to Chem. Abst. 6 2073 (1912)] (8.23 g., 0.06 mole), and 200 ml. of n-butyl alcohol is refluxed for 21 hours. The solution is evaporated and the residue is dissolved in 50 ml. of water and 100 ml. of methylene chloride. The resulting organic layer is separated, washed with water (3 × 50 ml.), saturated salt solution, dried over anhydrous magnesium sulfate and evaporated. The residue is shaken with 50 ml. of each, water and ether, and the resulting solid is filtered, washed with water then ether. Crystallization from ethyl acetate-ether gives 4.8 g. (65% yield) of 8-chloro-6-phenyl-1-(2-pyridyl)-4H-s-triazolo[4,3-a][1,4]benzodiazepine of melting point 188.5°–190° C., raised to 189°–190° on recrystallization from ethyl acetate-ether.

Anal. calcd. for $C_{21}H_{14}ClN_5$:
C, 67.83; H, 3.79; Cl, 9.53; N, 18.84.
Found: C, 67.54; H, 3.86; Cl, 9.60; N, 18.75.

EXAMPLE 4

8-Chloro-6-(o-chlorophenyl)-1-(4-pyridyl)-4H-s-triazolo[4,3-a][1,4]benzodiazepine A mixture of 7-chloro-1,3-dihydro-5-(o-chlorophenyl)-2H-1,4-benzodiazepine-2-thione (6.42 g., 0.02 mole), isonicotinic acid hydrazide (8.23 g., 0.06 mole) and 200 ml. of n-butyl alcohol is refluxed for 21 hours. The solution is evaporated, and the residue shaken with 50 ml. of water and 100 ml. of ether until a suspension results. The mixture is filtered and the solids washed with water then ether. Crystallization from methylene chloride-methanol gives 5.75 g. of 8-chloro-6-(o-chlorophenyl)-1-(4-pyridyl)-4H-s-triazolo[4,3-a][1,4]benzodiazepine (71% yield) of melting point 264°–265° C., unchanged on recrystallization from methylene chloride-methanol.

Anal. calcd. for $C_{21}H_{13}Cl_2N_5$:
C, 62.08; H, 3.22; Cl, 17.45; N, 17.25.
Found: C, 61.71; H, 3.31; Cl, 17.73; N, 17.32.

EXAMPLE 5

8-Chloro-1-(2-furyl)-6-phenyl-4H-s-triazolo-[4,3-a][1,4]benzodiazepine

A mixture of 7-chloro-1,3-dihydro-5-(phenyl)-2H-1,4-benzodiazepine-2-thione (5.74 g., 0.02 mole), 2-furoic acid hydrazide 97.56 g., 0.06 mole) and 200 ml. of n-butyl alcohol is refluxed for 22 hours. The solution was evaporated and the residue was dissolved in methylene chloride and water. The resulting organic layer was separated, washed with water, dried over anhydrous magnesium sulfate and evaporated. The residue was shaken with 50 ml. of each, ether and water, and the resulting solid was filtered and washed with ether then with water. Crystallization from methylene chloride-ether gave 5.8 g. of the methylene chloride solvate of 8-chloro-1-(2-furyl)-6-phenyl-4H-s-triazolo[4,3-a][1,4]benzodiazepine of melting point 125°–126.5° C. and 208.5°–209.5° C. The second crop was 1.51 g. of the same double melting point. The sample was dried at 100° C. to get rid of methylene chloride and obtain the solvent-free product.

Anal. calcd. for $C_{20}H_{13}ClN_4O$:
C 66.58; H, 3.63; Cl, 9.83; N, 15.53.
Found: C, 66.64; H, 3.64; Cl, 9.90; N, 15.70.

EXAMPLE 6

1-(4-Pyridyl)-6-(o-chlorophenyl)-4H-s-triazolo-[4,3-a][1,4]benzodiazepine

A mixture of 1,3-dihydro-5-(o-chlorophenyl)-2H-1,4-benzodiazepine-2-thione (5.73 g. 0.02 mole), isonicotinic acid hydrazide (8.23 g., 0.06 mole) and 200 ml. of n-butyl alcohol is refluxed for 18 hours. The solution is evaporated to dryness to give a solid crystalline product. This product is dissolved in water, filtered and dried to give 7 g. of 1-(4-pyridyl)-6-(o-chlorophenyl-4H-s-triazolo-[4,3-a][1,4]benzodiazepine, which is recrystallized from methanol-ether to give 5.9 g. of the purified product of melting point 235°–236°C. The analytical sample has a melting point 234°–235°C. on further recrystallization from methanol-ether.

Anal. calcd. for $C_{21}H_{14}ClN_5 \cdot 1/3\ H_2O$:
C, 66.76; H, 3.91; Cl, 9.38; N, 18.54.
Found: C, 67.00; H, 3.92; Cl, 9.47; N, 18.63.

EXAMPLE 7

8-Chloro-1-(2-thienyl)-6-phenyl-4H-s-triazolo-[4,3-a][1,4]benzodiazepine

A.

97-Chloro-1,3-dihydro-5-phenyl-2H-1,4-benzodiazepine-2-ylidene)-2-thiophene carboxylic acid hydrazide A mixture of 7-chloro-1,3-dihydro-5-phenyl-2H-1,4-benzodiazepine-2-thione (11.43 g., 0.04 ml.) and 2-thiophenecarboxyhydrazide (11.36 g., 0.08 mol.) is stirred for 45 minutes at room temperature in 300 ml. of 1-butanol. The mixture is gradually heated to reflux and after 1 hour a precipitate is formed. The mixture is heated for an additional 2 hours and then cooled to room temperature. The solid is collected by filtration and washed with 1-butanol and dried to give 10 g. of (7-chloro-1,3-dihydro-5-phenyl-2H-1,4-benzodiazepine-2-ylidene)-2-thiophenecarboxylic acid hydrazide. An analytical sample is crystallized from tetrahydrofuran-hexane to give an amorphous solid of melting point 227°–229° C. (decomp.)

Anal. calcd. for $C_{20}H_{15}ClN_4OS$:
C, 60.83; H, 3.38; N, 14.19; Cl, 8.98.
Found: C, 60.59; H, 3.87; N, 14.17; Cl, 9.10.

B.

8-Chloro-1-(2-thienyl)-6-phenyl-4H-s-triazolo[4,3-a]-[1,4]benzodiazepine (7-Chloro-1,3-dihydro-5-phenyl-2H-1,4-benzodiazepine-2-ylidene)-2-thiophenecarboxylic acid hydrazide (6.2 g., 0.016 mol.) is dissolved in 160 ml. of n-butanol and refluxed for 65 hours to give 7.3 g. of 8-chloro-1-(2-thienyl)-6-phenyl-4H-s-triazolo[4,3-a][1,4]benzodiazepine as a crude oil which solidifies on standing. Recrystallization from ethyl acetate-hexane gives 3.85 g. of white needles of melting point 173°–179° C.

Anal. calcd. for $C_{20}H_{13}ClN_4S$:
C, 63.74; H, 3.48; N, 14.87; Cl, 9.41.
Found: C, 63.53; H, 3.48; N, 14.74; Cl, 9.48.

EXAMPLE 8

8-Chloro-1-(2-thienyl)-6-(o-chlorophenyl)-4H-s-triazolo[4,3-a][1,4]benzodiazepine A mixture of 7-chloro-5-(o-chlorophenyl)-1,3-dihydro-2H-1,4-benzodiazepine-2-thione (6.4 g., 0.02 mol.) and 2-thiophenecarboxylic acid hydrazide (8.52 g., 0.06 mol.) is refluxed in 200 ml. of n-butanol for 98 hours cooled to room temperature and concentrated in vacuo to a yellow solid. This solid is washed with water and ether and dried to give 5.99 g. of 8-chloro-1-(2-thienyl)-6-(o-chlorophenyl)-4H-s-triazolo[4,3-a][1,4]benzodiazepine as a white powder of melting point 250°–258° C. Recrystallization from chloroform-methanol gives an analytical sample of melting point 261°–263° C.

Anal. calcd. for $C_{20}H_{12}Cl_2N_4S$:
C, 58.40; H, 2.94; N, 13.62; Cl, 17.24
Found: C, 58.44; H, 2.98; N, 13.72; Cl, 17.40.

In the same manner given in the preceding Examples other compounds of formula II are produced. Representative compounds II, thus obtained, include:
1-(2-furyl)-6-phenyl-4H-s-triazolo[4,3-a][1,4]benzodiazepine;
1-(2-furyl)-8-chloro-6-(o-chlorophenyl)-4H-s-triazolo-[4,3-a][1,4]benzodiazepine;
1-(2-pyridyl)-8-chloro-6-(o-chlorophenyl)-4H-s-triazolo-[4,3-a][1,4]benzodiazepine;
1-(4-pyridyl)-8-methylthio-6-(o-bromophenyl)-4H-s-triazolo-[4,3-a][1,4]benzodiazepine;
1-(2-pyridyl)-6-(o-chlorophenyl)-4H-s-triazolo[4,3-a][1,4]-benzodiazepine;
1-(3-pyridyl)-8-trifluoromethyl-6-(o-chlorophenyl)-4H-s-triazolo[4,3-a][1,4]benzodiazepine;
1-(4-pyridyl)-8-fluoro-6-(m-nitrophenyl)-4H-s-triazolo-[4,3-a][1,4]benzodiazepine;
and the like.

EXAMPLE 9

8-Chloro-1-(2-pyridyl)-6-phenyl-4H-s-triazolo-[4,3-a][1,4]benzodiazepine-5-oxide A stirred solution of 8-chloro-1-(2-pyridyl)-6-phenyl-4H-s-triazolo[4,3-a][1,4]benzodiazepine (3.0 millimoles) in absolute ethanol in an ice bath was treated with perbenzoic acid (6.0 millimoles). The mixture was allowed to stand in the ice bath for 12 hours and then at room temperature (about 24° C.) for 18 hours. It was then concentrated in vacuo, the residue suspended in aqueous cold, dilute potassium carbonate solution and extracted with methylene chloride. The extract was washed with water, dried and concentrated in vacuo to give 8-chloro-1-(2-furyl)-6-phenyl-4H-s-triazolo[4,3-a][1,4]benzodiazepine-5-oxide.

EXAMPLE 10

8-Chloro-1-(2-furyl)-6-phenyl-4H-s-triazolo-[4,3-a][1,4]benzodiazepine-5-oxide

A stirred solution of 8-chloro-1-(2-furyl)-6-phenyl-4H-s-triazolo[4,3-a][1,4]benzodiazepine (3.0 millimoles) in absolute ethanol in an ice bath was treated with perbenzoic acid (6.0 millimoles). The mixture was allowed to stand in the ice bath for 12 hours and then at room temperature (about 24° C.) for 18 hours. It was then concentrated in vacuo, the residue suspended in aqueous cold, dilute potassium carbonate solution and extracted with methylene chloride. The extract was washed with water, dried and concentrated in vacuo to give 8-chloro-1-(2-furyl)-6-phenyl-4H-s-triazolo[4,3-a][1,4]benzodiazepine-5-oxide.

In the manner illustrated in Examples 9 and 10, other N-oxides of compounds of formula II are made by reacting such compounds with organic peracids.

Treating the compounds of formula II or N-oxide of formula II compound with pharmacologically acceptable acid such as hydrochloric, hydrobromic, phosphoric, sulfuric, actic, propionic, toluenesulfonic, methanesulfonic, tartaric, citric, lactic, malic, maleic, cyclohexanesulfamic acids produces the pharmacologically acceptable salts of these compounds of formula II which can be used like the free base compounds of formula II and the N-oxides thereof. Salt formation is achieved in conventional manner by reacting the compounds of formula II (including IIA and IIB) or N-oxides thereof with excess of a selected acid in a suitable medium e.g. water, a lower alkanol, ether, or acetone and recovering the salt by evaporating the solvent, preferably in vacuo.

I claim:
1. A compound selected from the group consisting of 1,6-disubstituted-4H-s-triazolo[4,3-a][1,4]benzodiazepine of the formula II

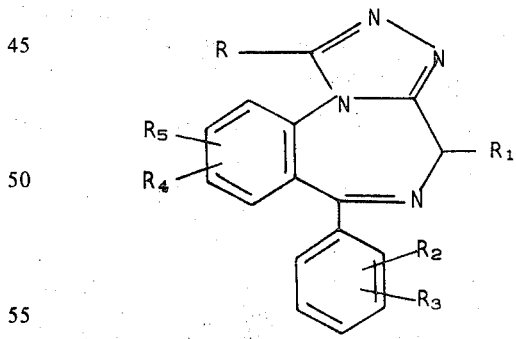

II wherein R is an aromatic heterocyclic ring radical selected from the group consisting of 2-, 3-, and 4-pyridyl, 2-thienyl, and 2-furyl; wherein $R_1$ is hydrogen or alkyl of one to three carbon atoms, inclusive; and wherein $R_2$, $R_3$, $R_4$, and $R_5$ are selected from the group consisting of hydrogen, halogen, nitro, trifluoromethyl, and alkylthio in which alkyl is defined as above; the 5-N-oxides and the pharmacologically acceptable salts thereof.

2. A compound according to claim 1 of the formula

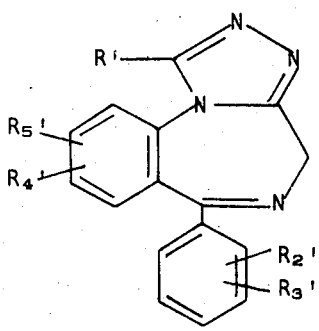

11A wherein R' is selected from the group consisting of 2-, 3-, and 4-pyridyl and wherein $R_2'$, $R_3'$, $R_4'$, and $R_5'$ is selected from the group consisting of hydrogen, halogen, and nitro, and the pharmacologically acceptable acid addition salts thereof and the 5-N-oxides thereof.

3. A compound according to claim 1 of the formula:

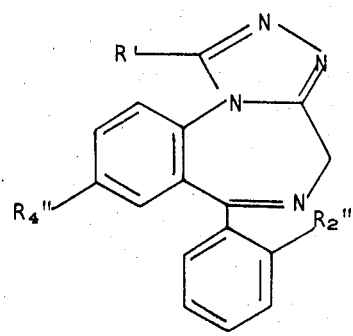

11B wherein R' is selected from the group consistin of 2-, 3-, and 4-pyridyl; and wherein $R_2''$ and $R_4''$ are selected from hydrogen and halogen, and the pharmacologically acceptable acid addition salts thereof.

4. A compound according to claim 3 wherein R' is 2-pyridyl, $R_2''$, is hydrogen, $R_4''$ is chloro and the compound is therefore 8-chloro-6-phenyl-1-(2-pyridyl)-4H-s-triazolo-[4,3-a][1,4]benzodiazepine.

5. A compound according to claim 3 wherein R' is 3-pyridyl, $R_2''$ is hydrogen, $R_4''$ is chloro and the compound is therefore 8-chloro-6-phenyl-1-(3-pyridyl)-4H-s-triazolo-[4,3-a][1,4]benzodiazepine.

6. A compound according to claim 3 wherein R' is 4-pyridyl, $R_2''$ is hydrogen, $R_4''$ is chloro and the compound is therefore 8-chloro-6-phenyl-1-(4-pyridyl)-4H-s-triazolo[4,3-a][1,4]benzodiazepine.

7. A compound according to claim 3 wherein R' is 4-pyridyl, $R_2''$ is chloro, $R_4''$ is chloro and the compound is therefore 8-chloro-6-(o-chlorophenyl)-1-(4-pyridyl)-4H-s-triazolo[4,3-a][1,4]benzodiazepine.

8. A compound according to claim 1 wherein R is 2-furyl $R_2$ is hydrogen, $R_4$ is chloro and the compound is therefore 8-chloro-6-phenyl-1-(2-furyl)-4H-s-triazolo[4,3-a][1,4]benzodiazepine.

9. A compound according to claim 1 wherein R is 2-thienyl, $R_2$, $R_3$, and $R_5$ are hydrogen, $R_4$ is 8-chloro and the compound is 8-chloro-1-(2-thienyl)-6-phenyl-4H-s-triazolo[4,3-a][1,4]-benzodiazepine.

10. A compound according to claim 1 wherein R is 2-thienyl, $R_3$ and $R_5$ are hydrogen $R_2$ is o-chloro, $R_4$ is 8-chloro and the compound is 8-chloro-1-(2-thienyl)-6-(o-chlorophenyl)-4H-s-triazolo[4,3-a][1,4]benzodiazepine.

* * * * *

UNITED STATES PATENT OFFICE
CERTIFICATE OF CORRECTION

Patent No. 3,856,802        Dated December 24, 1974

Inventor(s) Jacob Szmuszkovicz

It is certified that error appears in the above-identified patent and that said Letters Patent are hereby corrected as shown below:

Column 1, line 32, "II" should read -- III --. Column 2, line 5, "4-N" should read -- 5-N --; line 40, "-4-H-" should read -- -4H- --. Column 7, line 52, "97.56" should read -- (7.56 --. Column 8, line 37, "97-" should read -- (7- --. Column 9, line 33, "cl₂" should read -- Cl₂ --. Column 10, line 26, "actic" should read -- acetic --;

Signed and Sealed this

Nineteenth Day of October 1976

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,856,802
DATED : 24 December 1974
INVENTOR(S) : Jacob Szmuszkovicz It is certified that error appears in the above—identified patent and that said Letters Patent is hereby corrected as shown below:

Column 3, line 56, "methyl" should be deleted; line 57, "phenyl]" should read --phenyl--.

*Signed and Sealed this*

*Twenty-ninth* Day of *September 1981*

[SEAL]

*Attest:*

GERALD J. MOSSINGHOFF

*Attesting Officer*   *Commissioner of Patents and Trademarks*